US011283556B2

(12) United States Patent
Kaattari et al.

(10) Patent No.: US 11,283,556 B2
(45) Date of Patent: Mar. 22, 2022

(54) RECEIVING FRAMES AT REDUNDANT PORT CONNECTING NODE TO COMMUNICATIONS NETWORK

(71) Applicant: TTTech Flexibilis Oy, Tampere (FI)

(72) Inventors: Janne Kaattari, Tampere (FI); Timo Koskiahde, Koura (FI); Jouni Kujala, Tampere (FI)

(73) Assignee: TTTECH FLEXIBILIS OY, Tampere (FI)

( * ) Notice: Subject to any disclaimer, the term of this patent is extended or adjusted under 35 U.S.C. 154(b) by 340 days.

(21) Appl. No.: 16/307,975

(22) PCT Filed: Jun. 8, 2017

(86) PCT No.: PCT/FI2017/050425
§ 371 (c)(1),
(2) Date: Dec. 7, 2018

(87) PCT Pub. No.: WO2017/212118
PCT Pub. Date: Dec. 14, 2017

(65) Prior Publication Data
US 2019/0305900 A1 Oct. 3, 2019

(30) Foreign Application Priority Data
Jun. 10, 2016 (FI) .................................. 20165483

(51) Int. Cl.
*G06F 11/00* (2006.01)
*H04L 1/22* (2006.01)
(Continued)

(52) U.S. Cl.
CPC ............... *H04L 1/22* (2013.01); *G06F 11/14* (2013.01); *H04L 12/42* (2013.01); *H04L 45/24* (2013.01);
(Continued)

(58) Field of Classification Search
CPC .... G06F 11/0709; G06F 11/14; G06F 11/142; G06F 11/3024; G06F 11/078;
(Continued)

(56) References Cited

U.S. PATENT DOCUMENTS 6,181,704 B1 * 1/2001 Drottar ................. H04L 1/0057
370/231
6,628,967 B1 * 9/2003 Yue .................... H04M 1/72547
370/465

(Continued)

FOREIGN PATENT DOCUMENTS

CN 101753348 A 6/2010
CN 102106121 A 6/2011
(Continued)

OTHER PUBLICATIONS

H. Weibel, "Tutorial on Parallel Redundancy Protocol (PRP)", Zurich University of Applied Sciences Institute of Embedded Systems (InES), Jan. 8, 2008, pp. 1-20, XP055284179.
(Continued)

*Primary Examiner* — Sarai E Butler
(74) *Attorney, Agent, or Firm* — Buchanan Ingersoll & Rooney PC (57) ABSTRACT

Reception information of frames received at a redundant port may be stored to a data structure in group of data structures such that reception information of all frames in a sequence are not stored to the same data structure and the reception information can be quickly accessed for duplicate detection. The data structure includes reception information for a portion of consecutive frames in a sequence of frames transmitted by a specific transmitter node. A communications layer address of the transmitter node and information capable of identifying a portion of consecutive frames in a sequence of frames are derived from a received frame. The reception information for the received frame in the data
(Continued)

structure is read on the basis of derived information capable of identifying the received frame within the portion of consecutive frames.

18 Claims, 6 Drawing Sheets

(51) Int. Cl.
| | |
|---|---|
| *H04L 12/42* | (2006.01) |
| *H04L 45/24* | (2022.01) |
| *H04L 47/34* | (2022.01) |
| *G06F 11/14* | (2006.01) |
| *H04L 1/00* | (2006.01) |

(52) U.S. Cl.
CPC ...... *H04L 47/34* (2013.01); *H04L 2001/0095* (2013.01); *H04L 2012/421* (2013.01)

(58) Field of Classification Search
CPC ...... G06F 11/28; G06F 11/0727; G06F 11/22; H04L 1/22; H04L 12/42; H04L 45/24; H04L 47/34; H04L 2001/0095; H04L 2012/424
USPC ...................................................... 714/1–57
See application file for complete search history.

(56) References Cited

U.S. PATENT DOCUMENTS

| | | | |
|---|---|---|---|
| 7,352,753 B2 | 4/2008 | Glad et al. | |
| 7,389,353 B2 | 6/2008 | Latvala | |
| 7,406,082 B2 | 7/2008 | Nagarajan et al. | |
| 8,582,424 B2 | 11/2013 | Kirrmann | |
| 9,215,745 B1 * | 12/2015 | Dunsbergen | H04W 24/02 |
| 9,515,845 B2 | 12/2016 | Cachin et al. | |
| 2004/0062248 A1 | 4/2004 | Nagarajan et al. | |
| 2004/0139123 A1 * | 7/2004 | Glad | H04L 47/32 |
| 2006/0039405 A1 * | 2/2006 | Day | H04L 47/34 |
| | | | 709/250 |
| 2007/0028140 A1 * | 2/2007 | Takeda | G11B 20/1833 |
| | | | 714/6.12 |
| 2007/0223533 A1 * | 9/2007 | Kirrmann | H04L 41/0659 |
| | | | 370/469 |
| 2010/0107008 A1 * | 4/2010 | Radulescu | H04L 1/1848 |
| | | | 714/18 |
| 2011/0116508 A1 | 5/2011 | Kirrmann | |
| 2011/0191627 A1 * | 8/2011 | Koning | G06F 11/20 |
| | | | 714/5.1 |
| 2012/0278664 A1 * | 11/2012 | Kazui | G06F 3/061 |
| | | | 714/48 |
| 2014/0136901 A1 * | 5/2014 | Butler | G06F 11/302 |
| | | | 714/38.1 |
| 2014/0177477 A1 | 6/2014 | Cachin et al. | |
| 2014/0269688 A1 | 9/2014 | Alsup et al. | |
| 2015/0049639 A1 | 2/2015 | Angst et al. | |
| 2015/0254871 A1 * | 9/2015 | MacMillan | G06T 3/0062 |
| | | | 382/180 |
| 2015/0281335 A1 | 10/2015 | Heine et al. | |
| 2015/0295635 A1 | 10/2015 | Koskiahde et al. | |
| 2015/0351115 A1 * | 12/2015 | Jeon | H04W 16/14 |
| | | | 455/450 |
| 2016/0154708 A1 * | 6/2016 | Layne | G06F 11/2097 |
| | | | 714/19 |
| 2016/0365121 A1 * | 12/2016 | DeCaprio | G06K 9/6267 |
| 2017/0118141 A1 | 4/2017 | Alsup et al. | |
| 2017/0277151 A1 * | 9/2017 | Liu | G06F 11/2028 |

FOREIGN PATENT DOCUMENTS

| | | |
|---|---|---|
| CN | 104184678 A | 12/2014 |
| EP | 2148473 A1 | 1/2010 |
| EP | 2282452 A1 | 2/2011 |
| WO | 2004059921 A1 | 7/2004 |

OTHER PUBLICATIONS

The extended European Search Report dated Nov. 25, 2019, by the European Patent Office in corresponding European Application No. 17809794.5. (8 pages).
Heine, et al., "The High-Availability Seamless redundancy protocol (HSR): Robust fault-tolerant networking and loop prevention through duplicate discard", 9th IEEE International Workshop, May 2012, pp. 213-222.
International Preliminary Report on Patentability (PCT/IPEA/409) dated Oct. 4, 2018, by the Finnish Patent Office as the International Preliminary Examining Authority for International Application No. PCT/FI2017/050425.
International Search Report (PCT/ISA/210) dated Sep. 12, 2017, by the Finnish Patent Office as the International Searching Authority for International Application No. PCT/FI2017/050425.
Search Report dated Dec. 1, 2016, by the Finnish Patent Office for Application No. 20165483.
Written Opinion (PCT/IPEA/408) dated Aug. 14, 2018, by the Finnish Patent Office as the International Preliminary Examining Authority for International Application No. PCT/FI2017/050425.
Written Opinion (PCT/ISA/237) dated Sep. 12, 2017, by the Finnish Patent Office as the International Searching Authority for International Application No. PCT/FI2017/050425.
Notification of the First Office Action dated Oct. 19, 2020, by the Chinese Patent Office in corresponding Chinese Patent Application No. 201780035076.X, and an English Translation of the Office Action. (22 pages).

* cited by examiner

RECEIVING FRAMES AT REDUNDANT PORT CONNECTING NODE TO COMMUNICATIONS NETWORK

FIELD

The embodiments relate to receiving frames at a redundant port connecting a node to a communications network and more particularly detecting duplicate frames.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Several communications protocols provide redundant communications using duplicate messages thereby ensuring that the message is received by the destination. IEC 62439-3 Edition 2 defines two redundancy protocols: Parallel Redundancy Protocol (PRP) and High-availability Seamless Redundancy (HSR) protocol.

Both PRP and HSR operate on Ethernet link layer, which is layer 2 of the the Open Systems Interconnection (OSI) model. The operation of both PRP and HSR is fully transparent for the layers above: while the source sends duplicates, the receiver must be able to remove duplicates and it delivers only a single frame to the layers above.

The PRP and HSR protocols define that a source address together with a sequence number shall be used for detecting duplicates. The both HSR and PRP include both a source Medium Access Control (MAC) address and a 16 bit sequence number in every frame that is sent. The HSR/PRP source node adds the sequence numbers to the frames. A sequence number is source MAC address specific, i.e. every source has its own running sequence number that is incremented by one for every frame sent to the PRP/HSR network. The HSR/PRP node sends the same data duplicated via two paths with the same sequence number.

When the two paths do not have faults, the duplicate frames are received via both paths at the destination node. However, since only one frame is needed at the destination node, the duplicates need to be discarded. Failing to identify duplicates and to discard correct frames may prevent optimal operation of upper layer protocols, e.g. those on top of UDP or layer 2 and those that have not been designed to deal with duplicates. Furthermore, duplicate frames increase the network load and the load of the nodes processing the received frames.

SUMMARY

An object of the present invention is to provide a method and an apparatus, a computer program product and a computer program for implementing the method so as to overcome at least part of the above problems. The objects of the invention are achieved by a method and an apparatus which are characterized by what is stated in the independent claims. The preferred embodiments of the invention are disclosed in the dependent claims.

Some embodiments provide that reception information of frames received at a redundant port connecting a node to a communications network may be stored to a data structure in group of data structures such that reception information of all frames in a sequence are not stored to the same data structure and the reception information can be quickly accessed.

Some embodiments provide that reception information for frames in redundant communications may be stored in a bit vector in a hash table entry, whereby the speed of a hash table may be combined with the memory efficiency of a bit vector.

BRIEF DESCRIPTION OF DRAWINGS

In the following the invention will be described in greater detail by means of preferred embodiments with reference to the accompanying drawings, in which.

DETAILED DESCRIPTION, TEKNINEN KUVAUS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Various embodiments may comprise a new kind of data structure storing reception information for frames in redundant communications. An implementation of the embodiments described herein may comprise at least part of the means described in one or more embodiments described herein.

In the following description detection of duplicate frames received at a redundant port will be described in the context of PRP and HSR protocols and a network node implementing a HSR and/or PRP. However, it should be appreciated that the described embodiments may be applied also with other redundancy protocols and network nodes supporting redundancy.

A data structure may comprise one or more interrelated fields of data that may be preferably accessed by a single memory operation such as a read operation of data in the memory or write operation of data in the memory. The single memory operation may be facilitated that the data structure is stored to a continuous memory segment such that the data structure may be addressed using a single memory address. In the following a data structure is referred to as entry.

A group of data structures may comprise a plurality of data structures that are logically and/or physically interrelated in processing of the data structures. The data structures may be physically interrelated, if the data structures are stored to a continuous memory segment. The data structures may be logically interrelated, if the data structures are subjected to a data processing that is common to the data structures. In one example the data processing that is common may be a search operation, where a specific data structure and/or data stored in a data structure is searched from all the data structures in the group. The group of data structures may be addressed using a single memory address. Addresses of single data structures in the group may be derivable from the single memory address such that the data structures may be stored in separate memory segments, i.e. memory segments that are non-continuous. In the following a group of data structures is referred to as a row.

Groups of data structures may comprise a plurality of groups of data structures that are logically and/or physically interrelated in processing of groups. The groups may be physically interrelated, if the groups are stored to a continuous memory segment. The groups may be logically interrelated, if the groups have data structures that are similar, the same and/or are processed in a similar manner, whereby the groups may be subjected to a data processing that is common to the groups. In one example the data processing that is common may be a search operation for a data structure. In the following groups of data structures are referred to as a table.

In PRP and HSR a source address together with a sequence number of a frame may be used for detecting duplicates. HSR and PRP frames include both a source MAC address and a 16 bit sequence number in every frame that is sent. A HSR/PRP source node adds sequence numbers to the frames. A sequence number is source MAC address specific, i.e. every source has its own running sequence number that is incremented by one for every frame sent to the PRP/HSR network. The HSR/PRP node sends the same data in a redundant manner by duplicating the frame and sending the duplicates via two paths with the same sequence number. The receiver is able to detect if a received frame is a duplicate by checking if a frame with the same sequence number is already received from the same source MAC address. A sequence number is 16-bit value, which means that it overwraps after (2^16=) 65536 frames sent.

It should be appreciated that the number of redundant paths between a source and a destination may be greater than two, e.g. 3, 4 or any number, depending on implementation. Thereby, apparatuses supporting redundant communications on the redundant paths are provided with a number of ports corresponding to the number of paths.

Figure 1A:
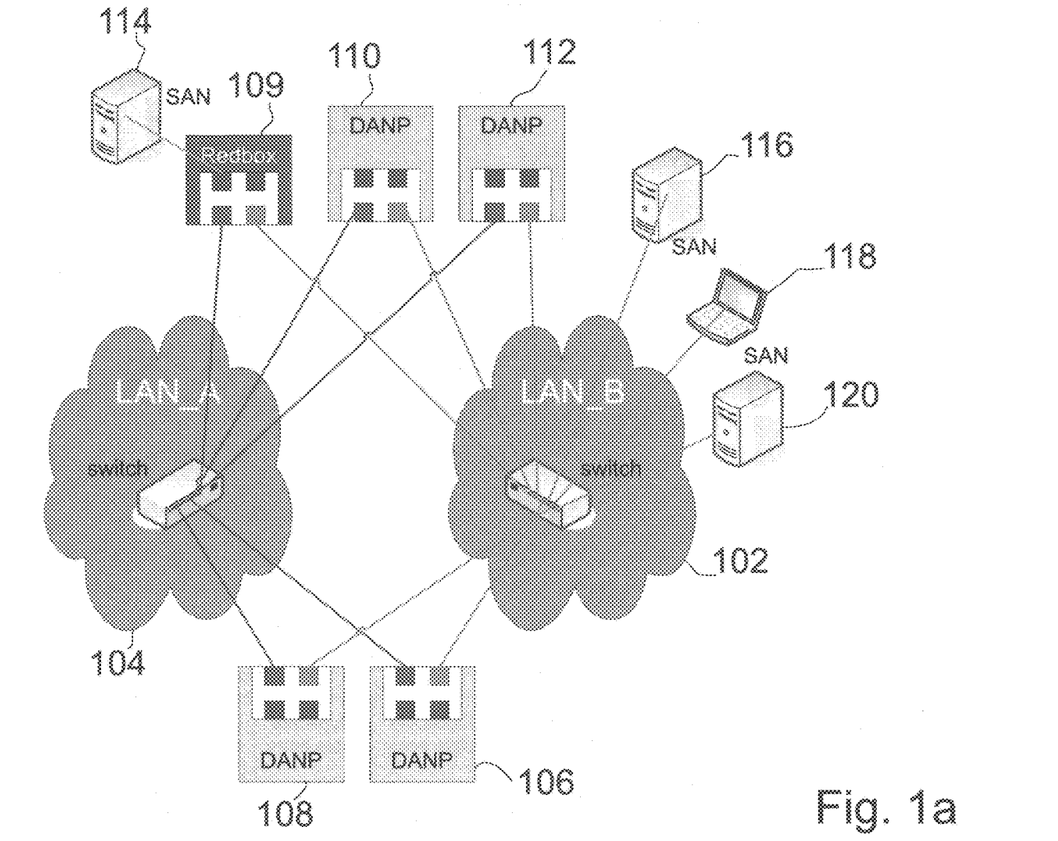
FIG. 1a illustrates a network architecture for carrying out an embodiment.

FIG. 1a illustrates network architecture for carrying out an embodiment. A Local Area Network A (LAN_A) 104 and a LAN_B 102 are separate LANs both employing a star topology, in star topology each frame is communicated via a central node in the network, e.g. switch. The central node relays frames received from a connected device to the other devices connected to the central node. Doubly Attached Nodes (DANs) 106, 108, 109, 110, 112 are connected to both of the LANs, thereby supporting redundancy in communications. Each of the LANs may also be connected to other devices than DANs for example Singly Attached Nodes (SANS) 114, 116, 118, and 120.

A source DAN duplicates each frame and sends the duplicates on both LANs. In this way a receiving DAN connected to the same LANs can receive the frame via two separate paths. In this way failure of one of the paths does not prevent the reception of the frame via the other path. A SAN may also be connected redundantly, by connecting it to the double star topology network though a device supporting redundancy in communications, a RedBox 109.

Figure 1B:
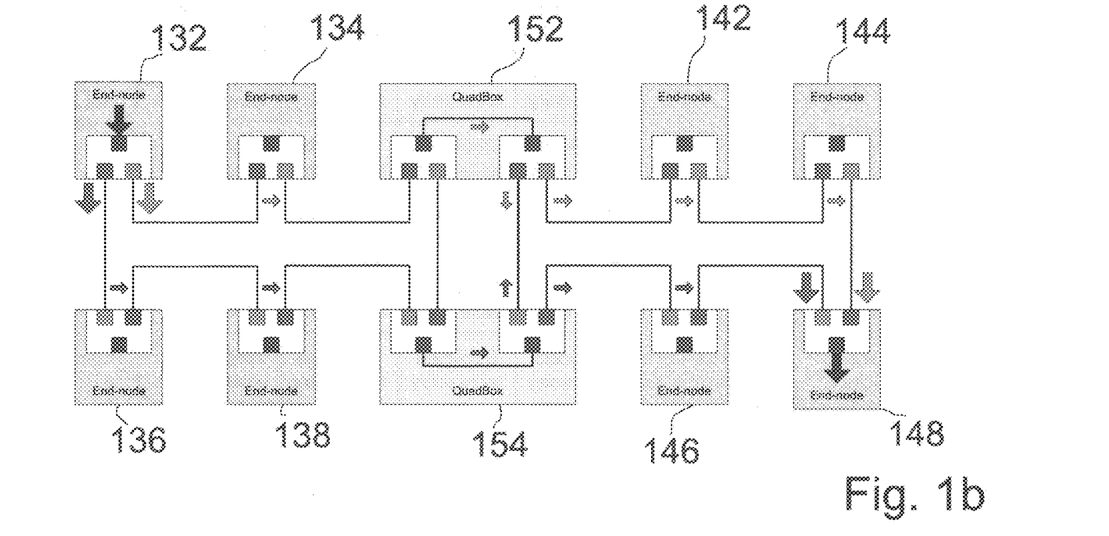
FIG. 1b illustrates another network architecture for carrying out an embodiment.

FIG. 1b illustrates another network architecture for carrying out an embodiment. DAN 132, 134, 136, 138, 142, 144, 146 and 148 are connected to a ring topology network. Each DAN in the ring topology network is connected to neighboring nodes and relays frames received from one neighbor node to the other neighbor node. In the illustrated example of the ring topology, the DANs 132, 134, 136 and 138 are connected to a first ring and the 142, 144, 146 and 148 are connected to a second ring. The two rings are redundantly interconnected by two paths between the rings provided by, QuadBoxes 152 and 154. The QuadBoxes may be implemented by a DAN in each ring topology network connected by a non-redundant connection. When two rings are connected in this way, frames are redundantly communicated within each ring and between the rings connected by the QuadBoxes.

Figures 2A, 2B:
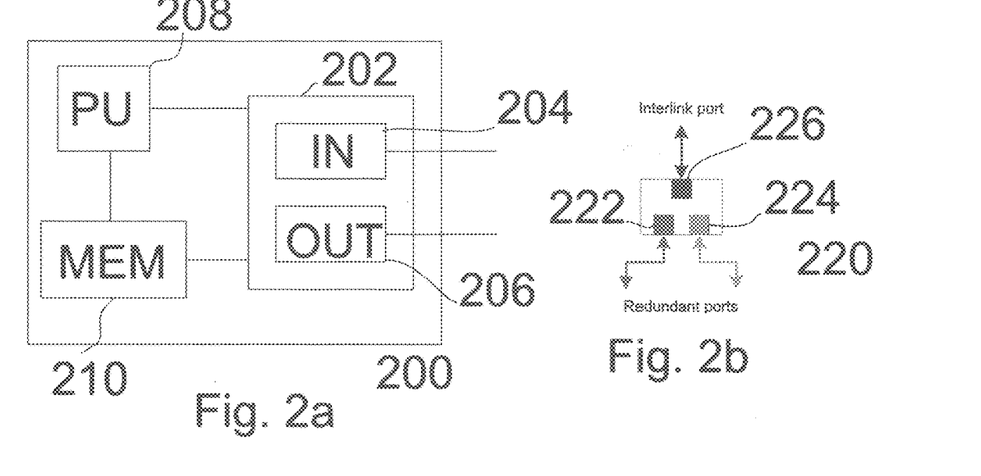
FIG. 2a illustrates a block diagram of an apparatus according to an embodiment.
FIG. 2b illustrates an architecture of apparatus according to an embodiment.

FIG. 2a is a block diagram of an apparatus 200 according to an embodiment. Although the apparatus has been depicted as one entity, different modules and memory may be implemented in one or more physical or logical entities. The apparatus may comprise a node supporting redundancy in communications. The node may be a network node in a communications network. The redundancy may be provided by redundancy in hardware components e.g. redundant ports, and/or redundancy in functionality, e.g. sending redundant frames. In redundant communications, the apparatus sends each frame redundantly. The redundancy may be provided by a number of connections used to send the frames, e.g. two or more separate connections. In one example this is achieved by the apparatus comprising a port corresponding to each connection. Having separate hardware, e.g. port for each redundant path provides sending redundant frames simultaneously, thereby without delays between frames sent on different paths. This is especially advantageous in real-time communications.

The apparatus 200 comprises an interfacing unit 202, a central processing unit (CPU) 208, and a memory 210, that are all being electrically interconnected. The interfacing unit comprises an input 204 and an output unit 206 that provide, respectively, the input and output interfaces to the apparatus. Accordingly, the output unit may be capable of transmitting frames and the input unit may be capable of receiving frames. The memory may comprise one or more applications that are executable by the CPU. The input and output units may be configured or arranged to send and receive data, frames, packets and/or messages according to one or more protocols. Examples of the protocols comprise communications layer protocols such as data link layer protocols including Medium Access Control (MAC) protocols defined by IEEE 802.3 Ethernet and IEEE 802.11 Wireless Local Area Network, WLAN, also known as the wireless Ethernet. Further examples are network layer protocols such as the Internet Protocol (IP) versions 4 and 6.

However, it should be appreciated that the protocols may include any other protocol on the data link layer, layer 2 or other layers in the OSI model that provides the functional and procedural means to transfer data between network entities. Therefore, various examples and embodiments described herein should be understood not to be limited to the data link layer address and MAC addresses, but they apply to various communications layer addresses used in various communications protocols, where a transmitter and received may be perform redundant communications.

In an embodiment, the apparatus may be connected or capable of being connected to one or more other nodes in a communications network or a region of the communications network, where nodes are uniquely identifiable on the basis of the communications layer protocol addresses of the nodes. Communications layer protocol IPv6 may be preferred over IPv4 since the address range of IPv6 is larger. In an example, the region of the communications network may comprise one or more single hop data link layer links, whereby the nodes may be uniquely identified on the basis of the data link layer addresses, e.g. MAC addresses. In an example, the region of the communications network may comprise a routing area for a specific range of IP addresses, for example a range of IPv4 addresses, whereby the nodes may be uniquely identified on the basis of the IP addresses in the routing area. The routing area may be connected to other regions of the communications network by a router connecting the regions.

Different parts of the apparatus 200 may be combined into a single unit to provide the functionality of the parts. Accordingly, the input 204 and output units 206 may be combined into a single unit providing the reception and sending of information.

In an embodiment, the apparatus comprises two or more interfacing units, i.e. ports, through which frames can leave and/or enter the apparatus. The two or more ports are redundant such that the apparatus sends each frame via each of the ports. The frames are preferably sent simultaneously in order to avoid any delays between the frames, as delay is undesirable especially in real-time communications.

In an embodiment the apparatus may comprise two or more redundant ports and a non-redundant port, whereby frames from the non-redundant port are sent via the redundant ports and each frame from the redundant ports is sent only once through the non-redundant port.

In an embodiment the input 204 unit may provide circuitry for obtaining data, frames, packets and/or messages to the apparatus. Accordingly, the input unit may serve for a receiver unit. The obtaining may comprise receiving radio frequency signals by an antenna, for example. In another example the obtaining by the input unit may comprise receiving an electrical signal on a wired connection.

In an embodiment the output unit 206 may provide circuitry for transmitting data, frames, packets and/or messages from the apparatus. Accordingly, the output unit may serve for a transmitter unit. The transmitting may comprise transmitting radio frequency signals by an antenna, for example. In another example the transmitting may comprise transmitting an electrical signal on a wired connection.

In an embodiment, the apparatus may provide redundant communications by connecting to a communications network on a communications layer with a plurality of redundant ports. Accordingly, the apparatus may comprise two or more redundant ports implementing the same protocols or different protocols. The protocols may be communications layer protocols. Examples of the different protocols may comprise those explained above. When different data link layer protocols define different physical layer protocols, e.g. by the Ethernet defining a wired physical layer and the WLAN defining a wireless physical layer, the redundant ports implementing different data link layer protocols may further implement different physical layers. In this way the redundant paths are separated by the physical medium used for transferring the frames, e.g. a wireless medium and a wired medium in case WLAN and Ethernet are used.

In an embodiment, apparatus may comprise two or more redundant ports implementing Ethernet and two or more redundant ports implementing WLAN. In this way the apparatus may provide redundancy in communications in both wired and wireless networks. The apparatus may be further provided with a non-redundant port for communications between the two networks. In this way the apparatus may operate as QuadBox as illustrated in FIG. 1*b*, between a first ring formed by a WLAN network of DANs 132, 134, 16 and 138 and a second ring formed by an Ethernet network of DANs 142, 144, 146, and 148. Accordingly, wired and wireless networks may be redundantly connected.

FIG. 2*b* illustrates architecture of apparatus 220 according to an embodiment. The apparatus may be implemented by the functional block of FIG. 2*a*, for example. The apparatus comprises two redundant ports 222 and 224 and an interlink port 226. The redundant ports support redundancy in communications as explained above. The interlink port is a non-redundant port. Thereby a frame received by one of the redundant ports is only sent once to the interlink port. Thereby, duplicate frames received after the first frame are not forwarded and they may be e.g. dropped, i.e. discarded. The apparatus 220 may be used in the DANs illustrated in FIG. 1*a* and FIG. 1*b*.

Figure 4:
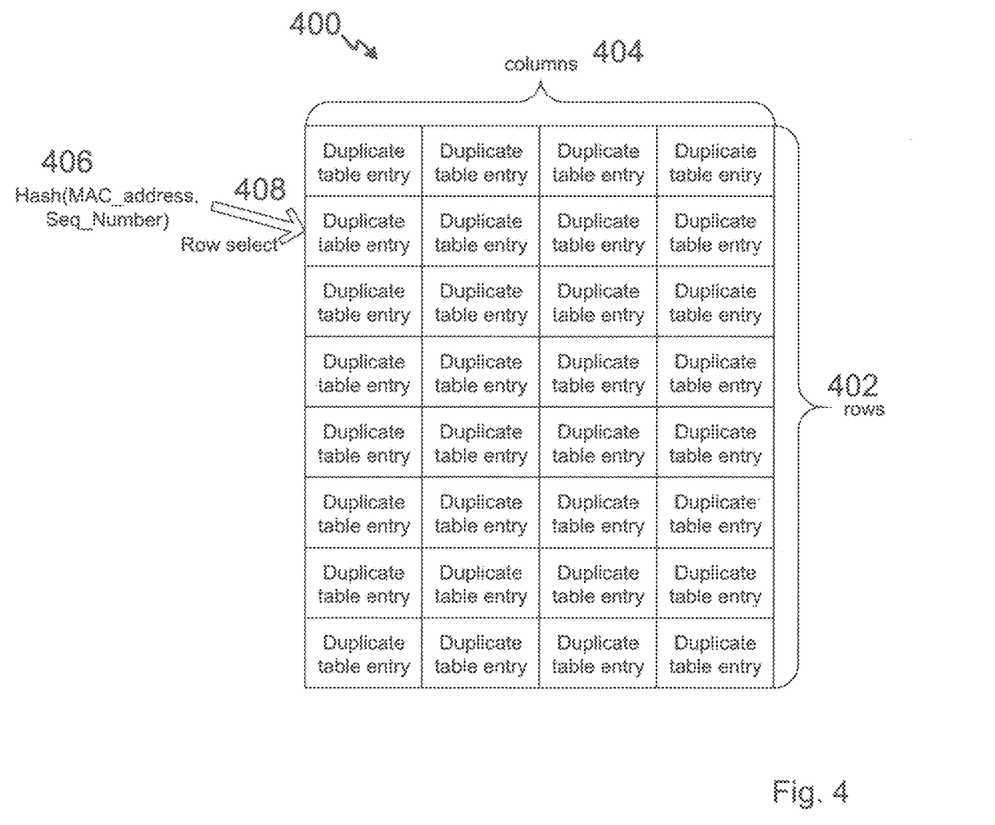
FIG. 4 illustrates an example of operating entries for storing reception information according to an embodiment.
Figure 5:
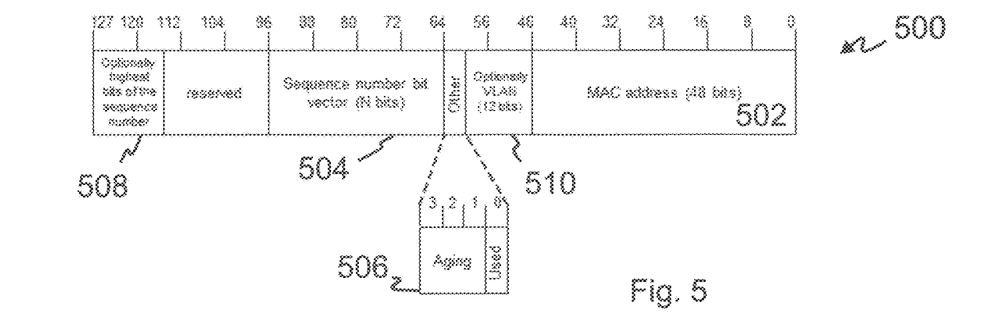
FIG. 5 illustrates an example of data structure for storing reception information for frames from a transmitter node, according to an embodiment.

FIG. 4 illustrates an example of operating entries 400 for storing reception information according to an embodiment. FIG. 5 illustrates an example of entry 500 for storing reception information 504 for frames from a transmitter node, according to an embodiment. The entry may have fields defined at bit positions between 0 to 127 according to the illustration in FIG. 5. Referring to FIG. 4 and FIG. 5, the entries 400 may be arranged in a table having several rows 402 and several columns 404. Each entry 500 may be an entry in the table 400 in a specific row and a specific column. The number of rows should be more than one, for example 2, 3 or 4 such that each row may store reception information in multiple entries and regarding frames from more than one transmitter.

It should be appreciated that the table is an example of implementation of the entries for illustration of the entries and the table, rows and/or columns may be implemented in various ways. In one example of the implementation, the table, rows and/or columns may be located in separate memory segments that are logically assigned to the same table.

The entry 500 may have an address field 502 for storing an address of the transmitter node and reception information field 504 for storing the reception information for frames from the transmitter node. The reception information field may comprise reception information for a portion of consecutive frames in a sequence of frames transmitted by the specific transmitter node. Thereby, reception information for all frames from the transmitter node are not stored in the same entry.

The reception information field may be a bit vector having the length N, where N is the number of bits. The length of the bit vector may be defined on the basis of the number of possible sequence number values for which reception information is stored in the entry. Therefore, the bit vector is capable of storing reception information only for a portion of the total number of sequence numbers. Preferably the bit vector stores reception information for consecutive frames that are selected from the sequence number space by a portion of the MSBs in a frame. Reception information may be stored uniquely for each frame in the portion of frames by a modulo operation described in formula (1) below. In this way reception information for any single frame in the portion of frames may be stored in a specific bit position in the reception information field.

The address in the address field facilitates identifying the entry for storing the reception information of the transmitter node in the row. The address of the transmitter node may be a communications layer address such as a data link layer address, for example a MAC address. Also other addresses are feasible.

In an embodiment the entry may comprise a Virtual Local Area Network VLAN identifier 510 and the highest bits 508 of the sequence number S. In this way the reception information stored in the entry may be defined more accurately in terms of the VLAN and the highest bits of the sequence number.

In an embodiment, the entry may comprise an aging indicator 506. The aging indicator may indicate whether the reception information in the entry is valid or invalid. The aging indicator may have at least one value that may indicate that the reception information is valid and at least one value that may indicate that the reception information is invalid. Other values may be implemented to indicate one or more periods that have passed since the reception information is last updated. At the indicated tune periods the aging indicator may be interpreted to indicate that the reception information is valid. The aging indicator may be updated continuously in the background while frames are received and processed.

At least one address for accessing a row in the table may be generated 406 on the basis of the address of the transmitter and information capable of identifying at least a portion of consecutive frames in a sequence of frames or the specific frame. In an example the address for accessing the row may be obtained by calculating by hashing the address of the transmitter and a sequence number of the received frame. It may be sufficient to use only a portion, e.g. the upper bits of the sequence number of the received frame. Once the address, e.g. row number, of the row has been obtained, the entries on the row may be operated 408. Various operations are possible and include reading and writing, for example.

Figure 3:
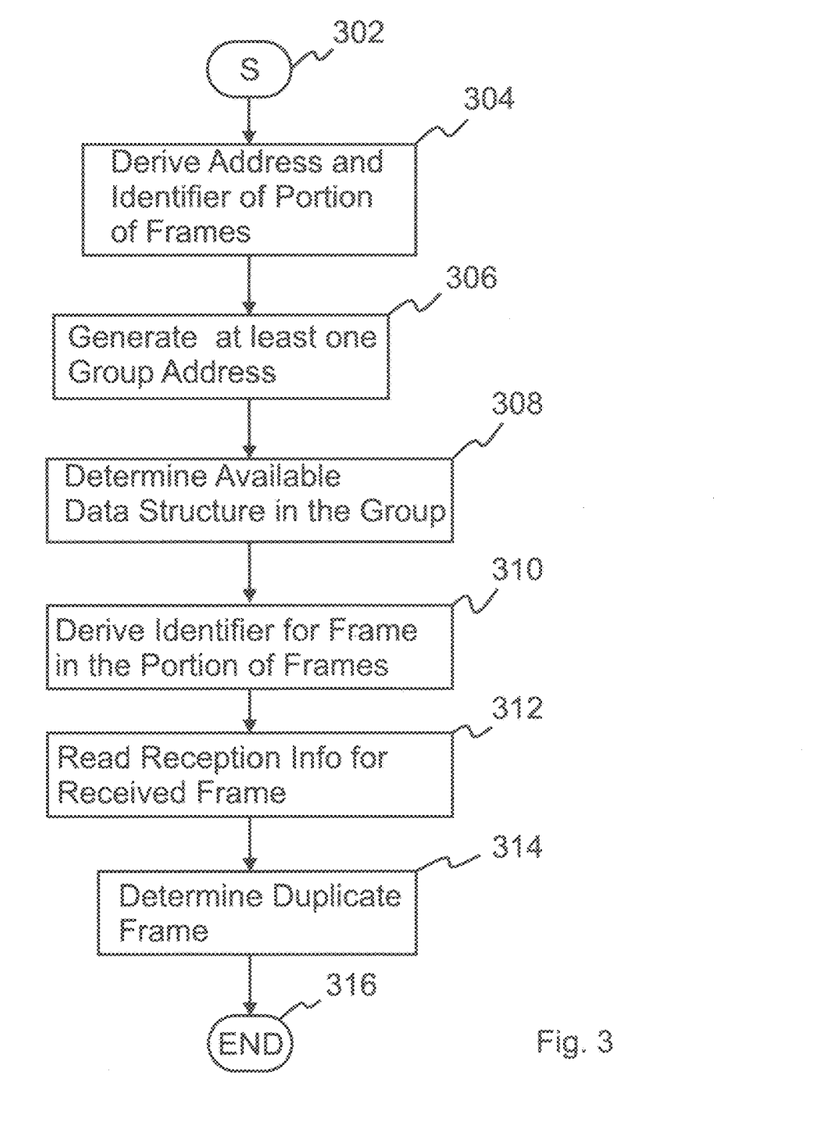
FIG. 3 illustrates a method for processing frames received at a redundant port connecting a node to a communications network, according to an embodiment.

FIG. 3 illustrates a method for processing frames received at a redundant port connecting a node to a communications network, according to an embodiment. In the method the frames may be processed using a table according to FIG. 4 that may include entries according to FIG. 5.

The method of FIG. 3 may start in 302, when one or more frames may be received at a redundant port connecting a node to a communications network. An apparatus may be redundantly connected by two or more ports to a communications network. The apparatus may have a table for storing reception information for frames transmitted by a specific transmitter node. The ports may be connected to other LANs as in FIG. 1a and/or to other network nodes as in FIG. 1b. A received frame at a redundant port may be identified by a sequence number associated with a source, i.e. transmitter node. The association of the source address and the sequence number may be established by the source address being included in the received frame as with HSR/PRP protocols. Accordingly, frames from each source are identifiable by a source address and a sequence number within each frame assigned by the source. It should be appreciated that the described method is explained for frames received by a redundant port, since the redundant ports are the source of the duplicate frames. However, the apparatus may also receive frames from non-redundant ports also for which duplicate detection is not necessary.

In 304, a communications layer address of the transmitter node of the frame and information capable of identifying a portion of consecutive frames in a sequence of frames may be derived from a received frame. The received frame belongs to the portion of frames identified by the information derived from the frame.

In an embodiment, information capable of identifying a portion of consecutive frames in a sequence of frames comprises a group of sequence numbers.

In an embodiment, information capable of identifying a portion of consecutive frames in a sequence of frames comprises one or more most significant bits MSBs in a sequence number bit vector. The MSBs may serve for identifying a group of sequence numbers.

In 306, at least one address for accessing a row in the table, may be generated, on the basis of the derived communications layer address and the information capable of identifying a portion of consecutive frames in a sequence of frames. The address may be a row number or a memory address corresponding to the row. In this way the addresses for accessing a row in the table for frames that belong to different portions of consecutive frames may also be different and the reception information of all frames in a sequence are not stored to the same entry and row but the reception information may be stored to entries on different rows depending on the portion of consecutive frames the received frame belongs to.

In an embodiment, information capable of identifying the received frame within the portion of consecutive frames in a sequence of frames comprises least significant bits LSBs of sequence number in a sequence number bit vector.

In 308, an available entry for storing reception information for frames from the transmitter node, in the row accessible by the generated address for accessing rows in the table, may be determined on the basis of the derived communications layer address. Accordingly, the reception information may be quickly accessed on the basis of the information derived from the received frame pointing to the row and the entry.

In an embodiment, the available entry for storing reception information for the transmitter node is empty, stores reception information for the transmitter node or comprises aged reception information. An empty entry may be an entry that includes no content. Accordingly, when the entry is empty the entry may have been initialized such that the entry may be accessed by read and write operations, but after initialization no content may have been written to the entry.

In 310, information capable of identifying the received frame within the portion of consecutive frames in a sequence of frames, may be derived from the received frame. In this way the received frame may be identified in an efficient manner since only the portion of consecutive frames in a sequence of frames is considered.

In 312, the reception information for the received frame in the entry may be read, on the basis of the derived information capable of identifying the received frame within the portion of consecutive frames in a sequence of frames.

In 314, whether the received frame is a duplicate frame may be determined on the basis of the read reception information. The reception information may be a hit vector, where each bit may correspond to a specific sequence number and the value of the bit, '0' or '1', may indicate whether the frame with the specific sequence number has been received.

In an embodiment, a row may be checked for reception information for frames from the transmitter node and if no reception information is found, the reception information of the transmitter node may be stored to an empty entry or to an entry comprising aged reception information, and if an entry for storing reception information for frames from the transmitter node is found, the reception information is stored to the found entry if the received frame is not a duplicate 314. The checking may be performed before the reception information is read 312.

The method may end 316 after the received frame is determined as a duplicate frame or a non-duplicate frame.

Figure 6:
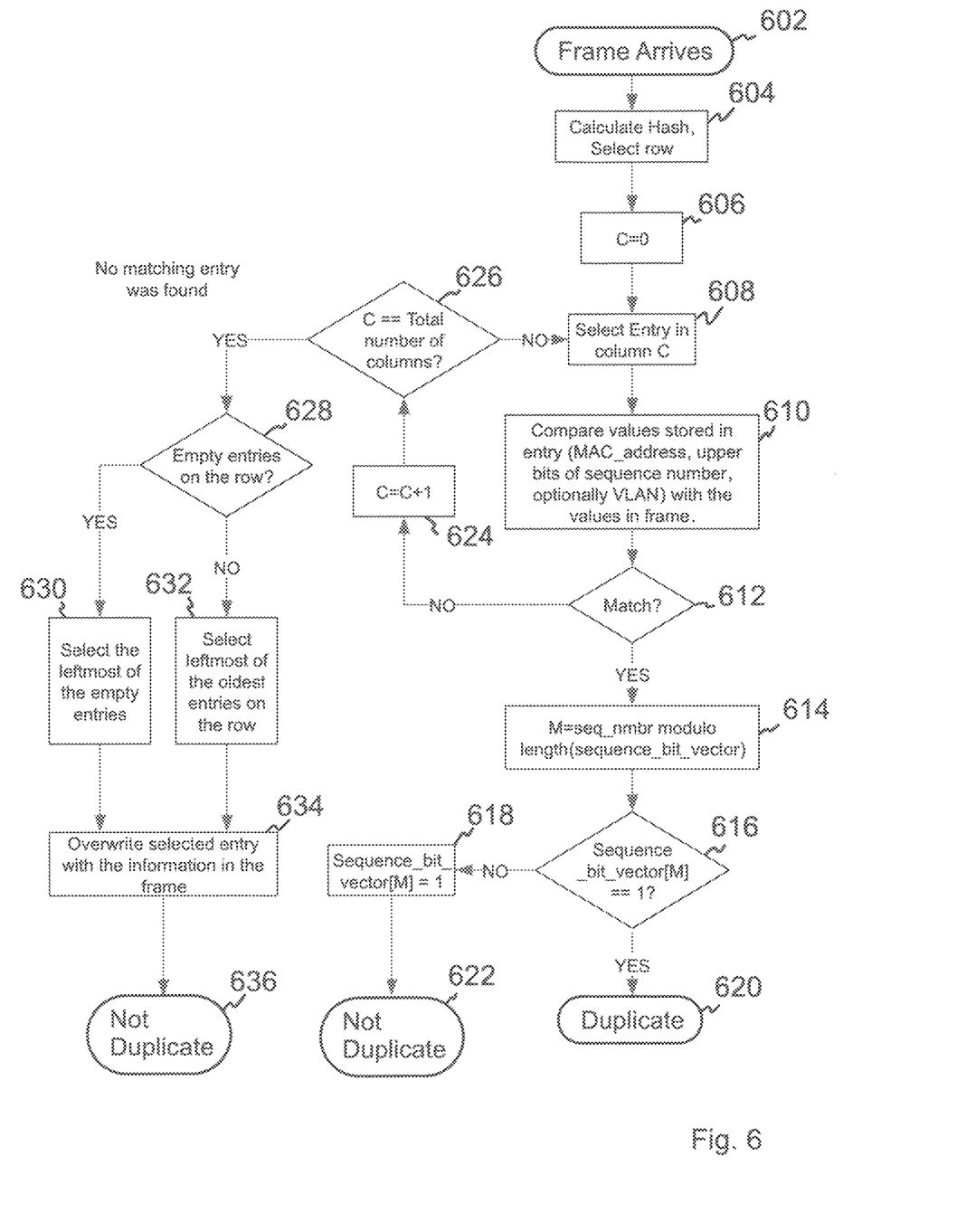
FIG. 6 illustrates a method for processing frames received at a redundant port connecting a node to a communications network for storing reception information in different available entries, according to an embodiment.

FIG. 6 illustrates a method for processing frames received at a redundant port connecting a node to a communications network for storing reception information in different available entries, according to an embodiment. In the method the frames may be processed using a table according to FIG. 4 that may include entries according to FIG. 5.

An available entry for storing reception information for the transmitter node may be empty, stores reception information for the transmitter node or comprises aged reception information. When 612 an available entry that stores reception information for the transmitter node exists in the table, the method may proceed to checking, whether the received frame is a duplicate 620 or not a duplicate frame 622. When 626 an available entry storing reception information is not found, an empty entry or the oldest entry may be selected 630, 632 for storing the reception information and the received frame may be determined not to be a duplicate.

The method of FIG. 6 may start, when one or more frames may be received at a redundant port connecting a node to a communications network. The apparatus may be redundantly connected by two or more ports to a communications network.

An apparatus may have a table for storing reception information for frames transmitted by a specific transmitter node. The ports may be connected to other LANs as in FIG. 1a and/or to other network nodes as in FIG. 1b. A received frame at a redundant port may be identified by a sequence number associated with a source, i.e. transmitter node. The association of the source address and the sequence number may be established by the source address being included in the received frame as with HSR/PRP protocols. Accordingly, frames from each source may be identifiable by a source address and a sequence number within each frame assigned by the source. It should be appreciated that the described method is explained for frames received by a redundant port, since the redundant ports are the source of the duplicate frames. However, the apparatus may also receive frames from non-redundant ports also for which duplicate detection is not necessary.

In 602, a frame that may be a duplicate may be received at a redundant port connecting a node to a communications network. A MAC address of the transmitter node and a sequence number of the frame may be derived from the received frame and used for generating an address to a row in the table. The sequence number may be processed to obtain information capable of identifying a portion of consecutive frames the received frame belongs to. The portion may be identified by one or more most significant bits MSBs in a sequence number bit vector.

In an embodiment, a table is checked 610, 612 for reception information for frames from the transmitter node and if 612 no reception information is found, the reception information of the transmitter node may be stored 630, 632 to an available entry that is an empty entry or an entry comprising aged reception information, and if 612 an entry for storing reception information for frames from the transmitter node is found, the reception information may be stored 618 to the found entry if 616 the stored reception information indicates that the received frame is 622 not a duplicate frame. It should be appreciated that if 612 no reception information is found, it may be determined 636 that the received frame is not a duplicate. On the other hand, if 612 an entry for storing reception information for frames from the transmitter node is found, the frame may be determined 620 a duplicate on the basis of the stored reception information. The aged reception information may be referred to an old entry or the oldest entry. The aging of the entry may be determined for example on the basis of an aging indicator 506 in FIG. 5.

The checking for reception information for frames from the transmitter node may comprise generating an address for a row in the table. The address may be generated by calculating 604 a row number in the table by a hash function from the MAC address, upper bits of the sequence number and optionally the VLAN identifier. The upper bits of the sequence number define a portion of consecutive frames in a sequence of frames. The row may be searched for an entry 606, 624 having the MAC address of the transmitter node and a sequence number of the received frame. The searching may comprise that the entries are selected 608 for the search, one by one, for example. The entries may be indexed by column indexes. The left most column (C) may have index '0', 'C=0', and the searching may start from the left most column, C=0. If 612 the reception information is not found the searching may proceed 624 to the next column, 'C=C+1', until the total number of columns has been searched and 'C=>total number of columns'. It should be appreciated that also further information may be stored in entries and checked 610, for example a Virtual Local Area Network (VLAN) identifier. The upper bits of the sequence number may define a portion of consecutive frames in a sequence of frames for which the entry may store reception information.

After the entry for storing reception information for frames from the transmitter node is found, the reception information for the received frame may be read 614 from the entry for determining whether the received frame is a duplicate 620 or not a duplicate 622.

The reception information may be stored in a bit vector, where each bit may correspond to a frame having a specific sequence number. The value of the bit may be used to indicate whether the frame is received or not. In an example, a bit value '1' may denote that the frame is received and a bit value '0' may denote that the frame is not received.

The reception information for the received frame may be read 614 from the bit vector in a position that may be determined as follows:

$$M = \text{sequence number modulo length (sequence number bit vector)} \quad (1),$$

wherein the sequence number may be derived from the received frame and the length (sequence number bit vector) is a function returning the length of the sequence number bit vector.

It should be appreciated that the reception information for the received frame may be written 618, 634 to the bit vector at bit position defined by the formula (1).

If 612 no reception information is found on the row the entry that is oldest and/or an empty entry may be selected 630, 632 for storing reception information. The available entries may have priorities, whereby the entry that has the highest priority may be selected. Examples of the priorities comprise age and/or position of the entry in the table. Using age as priority, the oldest entry may be given the highest priority. On the other hand using position as priority, the left most entry in the table and/or row may be given the highest priority. In this way an available entry, such as an empty entry and/or the oldest entry may be selected in an organized manner from a plurality of available entries that may include a mixture of empty entries and oldest entries. In example an entry may be assigned a priority on the basis of its position in the table and/or row. The prioritization may be based on indexing within the table and/or row. An entry in a starting position of the indexing may be assigned a highest priority than the entries in the following indexes. The priorities may decrease with distance to the starting position of the indexing. In a table, the indexing may start from the left most column and the entries in that column may have the highest priority, and the entries in the following columns may be decreasing with distance to the first column. Prioritized entries provide that reception information may be stored in an organized manner, whereby the likelihood of finding an empty entry may be increased. Moreover, since the reception information is stored to the entries according to their priorities, only the highest entries are primarily utilized, and checking of reception information may be fast.

In an embodiment, if 612 no reception information is found and if 628 there are no empty entries in the row, i.e. all the entries are storing reception information, the entry that is oldest may be selected 632 for storing reception information. The oldest entry may be selected on the basis of aging indicator in the entry and the reception information of the transmitter node may be stored 634 to the selected 632 entry. It should be appreciated that if there are more than one entry that may be considered as the oldest entry, the entry that has the highest priority may be selected.

In an embodiment, if 612 no reception information is found and if 628 there are empty entries in the row, the entry having the highest priority may be selected and the reception information of the transmitter node may be stored 634 to the selected entry. The entries may be prioritized on the basis of their position in the table and/or row. For example, the left most entry of the empty entries may be selected 630. Since the priorities of the entries are used for storing searching of the entries may be facilitated. It should be appreciated that the prioritization may be applied also to selecting the oldest entry for storing reception information. Accordingly, an entry having the highest priority may be selected from the oldest entries may be selected 632. This is particularly useful, when there are many entries that may be regarded as the same age, i.e. the oldest.

It should be appreciated that the procedure for selecting 630, 632 the entry for storing the reception information should be designed according to the procedure for checking the reception information such that the checking may be fast and the likelihood of finding an empty entry may be increased.

It should be appreciated that in addition to storing 634 the reception information, at least the MAC address of the transmitter node should be stored in the entry. The entry may store also other information, which should be written together with the reception information, when an empty or a non-empty entry is used for storing the reception information. Examples of the other information comprise one or more of fields described in FIG. 5, including WAN identifier and upper bits of the sequence number of the received frame.

In 636 the method may end and the received frame may be determined not to be a duplicate frame.

If 612 reception information is found, and if 616 the reception information indicates that the frame has been received, the received frame may be determined 620 as a duplicate frame and the method may end.

If 612 reception information is found, and if 616 the reception information may indicate that the frame has not been received, the received frame may be determined 622 not to be a duplicate frame. This means that the frame is received the first time and the reception information may be updated 618 to indicate that the frame has been received, when the stored reception information indicates that the received frame is not a duplicate frame. The reception information may be updated by changing a bit value in the bit vector at the position M that indicates reception information corresponding to the received frame. The method may end after the reception information has been updated and the received frame has been determined not to be a duplicate frame.

Figure 8:
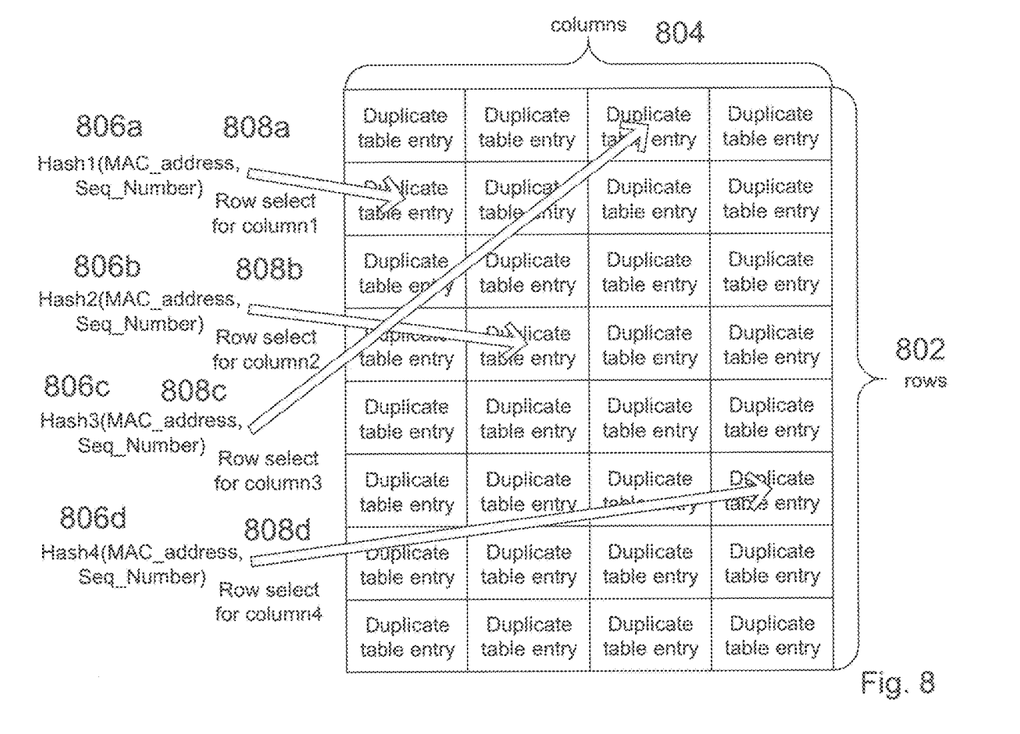
FIG. 8 illustrates an example of operating entries having priorities according to an embodiment.

FIG. 8 illustrates an example of operating entries having priorities according to an embodiment. The entries may be arranged in a table similar to described in FIG. 4 and the description of columns 404 and rows 402 apply to the columns 804 and rows 802 in FIG. 8. As a difference to the embodiment described in FIG. 4, a plurality of addresses for accessing different rows in the table may be generated 806a, 806b, 806c, 806d for operating 808a, 808b, 808c, 808d the entries on the rows.

Figure 9:
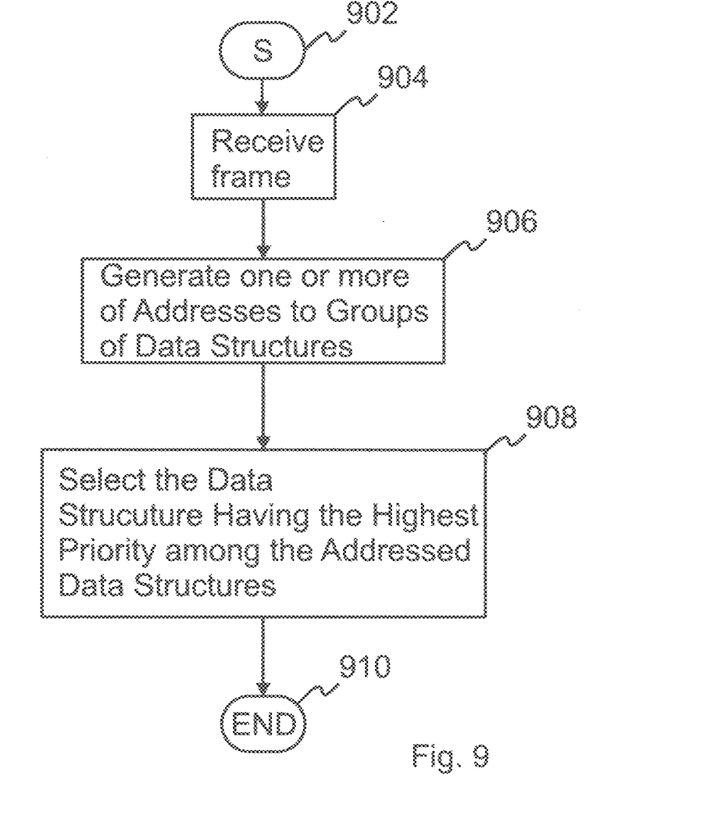
FIG. 9 illustrates a method for processing frames utilizing entries having priorities.

FIG. 9 illustrates a method for processing frames utilizing entries having priorities. In the method the frames may be processed using a table according to FIG. 8 that may include entries according to FIG. 5.

The method may start in 902, when one or more frames may be received at a redundant port connecting a node to a communications network similar to described in 302 with FIG. 3.

In 904, a frame that may be a duplicate may be received at a redundant port connecting a node to a communications network similar to described in 602 in FIG. 6.

In 906, a plurality of addresses for accessing different rows in the table may be generated on the basis of the derived communications layer address and the information capable of identifying a portion of consecutive frames in a sequence of frames the received frame belongs to.

In 908, the entry having the highest priority among the available entries in the rows addressed by the generated addresses for storing reception information for the transmitter node, may be selected. In this way the reception information may be distributed among the rows such that the likelihood of filling every entry in a single row may be reduced.

In an example referring to FIG. 8, the entries may be assigned priorities such that an entry the left most column has the highest priority and the priorities are decreased to the right from the left most column. When the available entries are the entries pointed by arrows in FIG. 8, the entry in the column 1 may be selected since it has the highest priority from the four entries.

The method may end 910 after the priorities of the entries have been utilized in selecting the entry. The selected entry may be utilized in selecting an entry described in steps 630 and 632 for writing reception information 634.

Figure 7:
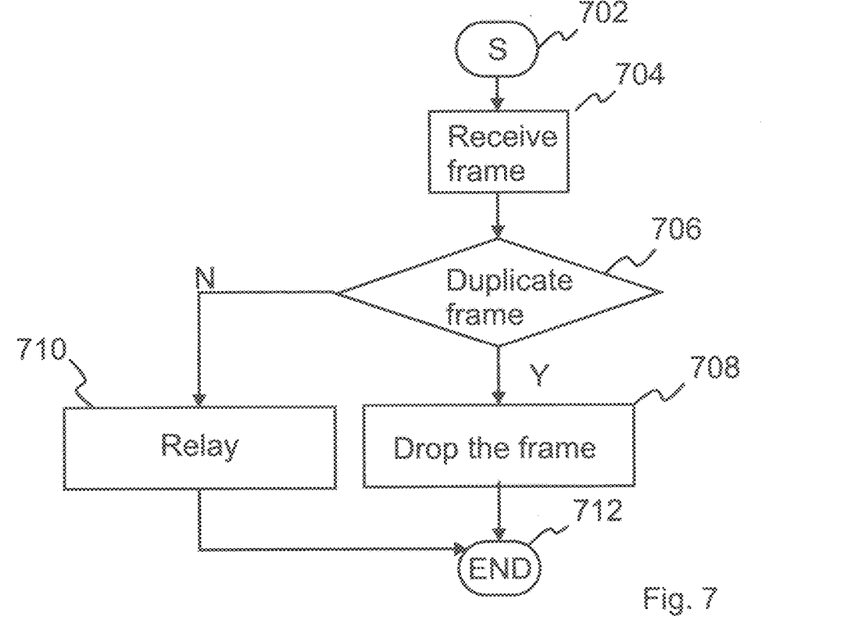
FIG. 7 illustrates a method of processing a received frame on the basis of reception information.

FIG. 7 illustrates a method of processing a received frame on the basis of reception information. The method may be applied to duplicate and not duplicate frames determined in the methods of FIGS. 3 and 6 for example. The method may start in 702, when one or more frames may be received at a redundant port connecting a node to a communications network similar to described in 302 with FIG. 3.

In 704, a frame that may be a duplicate may be received at a redundant port connecting a node to a communications network similar to described in 602 in FIG. 6.

If 706 the received frame is a duplicate frame, the received frame may be dropped 708. When the received frame is dropped, the frame may be deleted from memory or simply ignored for further processing.

If 706 the frame is not a duplicate frame the received frame may be relayed 710 to an output port or to a higher protocol layer, e.g. an application protocol layer, for further processing.

The method may end 712 after the received frame has been processed.

The steps/points, and related functions described above in FIGS. 3, 6, 7 and 9 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The apparatus 200 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, constitute the interface 202 providing one, two or more ports for redundant communications of frames.

An embodiment provides a record medium 210 storing a data structure for detecting duplicate frames received at a redundant port connecting a node to a communications network, whereby frames are identified by including a sequence number associated with a source, said data structure comprising, a source address stored in association with a newest sequence number of frames received from the source address at the redundant port, and a memory pointer to reception information determined for each frame within a window of frames from the source by corresponding sequence numbers, said window comprising sequence numbers preceding the newest sequence number and associated with reception information of a corresponding frame at the redundant port. An apparatus, a computer program and/or a computer program product according to an embodiment may operate on information read from the data structure and/or update the data structure.

The computer program may be in source code form, object code form, or in some intermediate form, and it may be stored in some sort of carrier, which may be any entity or device capable of carrying the program. Such carriers include a non-transitory computer readable storage medium, a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 200 may also be implemented as one or more integrated circuits, such as application-specific integrated circuits ASIC, software routines and/or programmable circuits. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

The present invention is applicable to network node and corresponding component, and/or to any communication system or any combination of different communication systems that support redundancy in communications. The communication system may be a fixed communication system or a wireless communication system or a communication system utilizing both fixed networks and wireless networks. The protocols used, the specifications of communication systems develop rapidly. Such development may require extra changes to an embodiment. Therefore, all words and expressions should be interpreted broadly and they are intended to illustrate, not to restrict, the embodiment.

Apparatuses, such as network nodes, or corresponding network node components and/or other corresponding devices or apparatuses implementing the functionality of a corresponding apparatus described with an embodiment comprise not only prior art means, but also means for deriving, from a frame received by a receiver unit, a communications layer address of the transmitter node of the frame and information capable of identifying a portion of consecutive frames in a sequence of frames the received frame belongs to; generating, on the basis of the derived communications layer address and the information capable of identifying a portion of consecutive frames in a sequence of frames, at least one address for accessing a group of data structures in the groups of data structures; determining, on the basis of the derived communications layer address, an available data structure for storing reception information for frames from the transmitter node, in the group of data structures accessible by the generated address for accessing a group of data structures in the groups of data structures; deriving, from the received frame, information capable of identifying the received frame within the portion of consecutive frames in a sequence of frames; reading, on the basis of the derived information capable of identifying the received frame within the portion of consecutive frames in a sequence of frames, the reception information for the received frame in the data structure; and determining whether the received frame is a duplicate frame on the basis of the read reception information.

More precisely, the various means comprise means for implementing functionality of a corresponding apparatus described with an embodiment and it may comprise separate means for each separate function, or means may be configured to perform two or more functions. Present apparatuses comprise processors and memory that can be utilized in an embodiment. For example, the DAN 220 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application-specific integrated circuits (ASIC) and/or programmable circuits. Further, software routines may be downloaded into an apparatus.

The apparatus, such as a network node or a corresponding network node component may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

For example, an apparatus according to an embodiment may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium (s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
 a receiver unit configured for receiving frames at a redundant port for connecting a node to a communications network;
 a memory having groups of data structures, wherein a data structure includes reception information for multiple consecutive frames in a sequence of frames transmitted by a specific transmitter node, the reception information indicating whether a frame belonging to multiple consecutive frames has been received or not;
 a processing unit operatively connected to the receiver unit and the memory, wherein, the processing unit, the receiver unit and the memory are configured with a computer program for causing the processing unit to:
  derive, from a frame received by the receiver unit, a communications layer address of the transmitter node of the frame and information for identifying multiple consecutive frames in a sequence of frames the received frame belongs to;
  generate, on the basis of the derived communications layer address and the information for identifying multiple consecutive frames in a sequence of frames, at least one address for accessing a group of data structures in the groups of data structures;
  determine, on the basis of the derived communications layer address, an available data structure for storing reception information for frames from the transmitter node in the group of data structures accessible by the generated address for accessing a group of data structures in the groups of data structures;
  derive, from the received frame, information for identifying the received frame within multiple consecutive frames in a sequence of frames;
  read, on the basis of the derived information for identifying the received frame within multiple consecutive frames in a sequence of frames, the reception information for the received frame in the data structure; and
  determine whether the received frame is a duplicate frame on the basis of the read reception information.

2. The apparatus according to claim 1, wherein the processing unit is configured to drop the received frame, when the received frame is a duplicate frame.

3. The apparatus according to claim 1, comprising:
 a transmitter unit configured for transmitting frames at an output port, whereby a received frame will be relayed by the transmitter unit and the reception information is set to indicate that the frame has been received, when the stored reception information indicates that the received frame is not a duplicate frame.

4. The apparatus according to claim 1, wherein the data structures in each group of data structures have a priority, and the processing unit, the receiver unit and the memory are configured to:
 generate, on the basis of the derived communications layer address and the information for identifying multiple consecutive frames in a sequence of frames the received frame belongs to, a plurality of addresses for accessing different groups of data structures in the groups of data structures; and
 select the data structure having the highest priority among the available data structures in the groups of data structures addressed by the generated addresses for storing reception information for the transmitter node.

5. The apparatus according to claim 1, wherein the available data structure for storing reception information for the transmitter node is at least one of empty, stores reception information for the transmitter node or includes aged reception information.

6. The apparatus according to claim 1, wherein the processing unit is configured to check the group of data structures is checked for reception information for frames from the transmitter node and if no reception information is found, the reception information of the transmitter node will be stored to an available data structure that is an empty data structure or a data structure having aged reception information, and if a data structure for storing reception information for frames from the transmitter node is found, the reception information will be stored to the found data structure if the received frame is not a duplicate frame.

7. The apparatus according to claim 1, wherein the reception information is stored to a data structure having the highest priority among the availa-ble data structures.

8. The apparatus according to claim 1, wherein the data structure comprises:
 an aging indicator for determining availability of the data structure.

9. The apparatus according to claim 1, wherein the processing unit is configured to generate address information by a hash function over the transmitter node communications layer address and information indicating multiple consecutive frames in a sequence of frames transmitted by the transmitter node, or over a Virtual Local Area Network VLAN identifier.

10. The apparatus according to claim 1, wherein the communications layer address is a Medium Access Control MAC address, Internet Protocol IP address, or an IPv6 or IPv4 address in a region of the communications network utilizing a specific range of IP addresses.

11. The apparatus according to claim 1, wherein the information for identifying multiple consecutive frames in a sequence of frames includes a group of sequence numbers.

12. The apparatus according to claim 1, wherein the information for identifying multiple consecutive frames in a sequence of frames includes one or more most significant bits MSBs in a sequence number bit vector.

13. The apparatus according to claim 1, wherein the information for identifying the received frame within multiple consecutive frames in a sequence of frames includes least significant bits LSBs of sequence number in a sequence number bit vector.

14. The apparatus according to claim 1, wherein a group of data structures comprises:
    2, 3, 4 or more data structures, and each data structure is configured for storing reception information for a portion of the frames identified by sequence numbers.

15. The apparatus according to claim 1, wherein a node provides redundant communications by connecting to a communications network on a communications layer with a plurality of redundant ports.

16. A method for an apparatus having:
    a receiver unit for receiving frames at a redundant port connecting a node to a communications network;
    a memory having groups of data structures, wherein a data structure includes reception information for multiple consecutive frames in a sequence of frames transmitted by a specific transmitter node, the reception information indicating whether a frame belonging to multiple consecutive frames has been received or not; and
    a processing unit operatively connected to the receiver unit and the memory, and configured with a computer program to cause with the processing unit, the receiver unit and the memory, to execute a method comprising:
    deriving, from a frame received by the receiver unit, a communications layer address of the transmitter node of the frame and information for identifying multiple consecutive frames in a sequence of frames the received frame belongs to;
    generating, on the basis of the derived communications layer address and the information for identifying multiple consecutive frames in a sequence of frames, at least one address for accessing a group of data structures in the groups of data structures;
    determining, on the basis of the derived communications layer ad-dress, an available data structure for storing reception information for frames from the transmitter node in the group of data structures accessible by the generated address for accessing a group of data structures in the groups of data structures;
    deriving, from the received frame, information for identifying the received frame within the multiple consecutive frames in a sequence of frames;
    reading, on the basis of the derived information for identifying the received frame within the multiple consecutive frames in a sequence of frames, the reception information for the received frame in the data structure; and
    determining whether the received frame is a duplicate frame on the basis of the read reception information.

17. The method according to claim 16, wherein the data structures in each group of data structures have a priority, and the processing unit executes a method which comprises:
    generating, on the basis of the derived communications layer address and the information for identifying multiple consecutive frames in a sequence of frames the received frame belongs to, a plurality of addresses for accessing different groups of data structures in the groups of data structures; and
    selecting the data structure having the highest priority among the available data structures in the groups of data structures addressed by the generated addresses for storing reception information for the transmitter node.

18. A computer program embodied on a non-transitory computer readable storage medium, the computer program being configured to control a processor to perform steps of: receiving frames by a receiver unit at a redundant port connecting a node to a communications network; storing in a memory groups of data structures, wherein a data structure includes reception information for multiple consecutive frames in a sequence of frames transmitted by a specific transmitter node, the reception information indicating whether a frame belonging to multiple consecutive frames has been received or not; deriving, from a frame received by the receiver unit, a communications layer address of the transmitter node of the frame and information for identifying multiple consecutive frames in a sequence of frames the received frame belongs to; generating, on the basis of the derived communications layer address and the information for identifying multiple consecutive frames in a sequence of frames, at least one address for accessing a group of data structures in the groups of data structures; determining, on the basis of the derived communications layer address, an available data structure for storing reception information for frames from the transmitter node in the group of data structures accessible by the generated address for accessing a group of data structures in the groups of data structures; deriving, from the received frame, information for identifying the received frame within multiple consecutive frames in a sequence of frames; reading, on the basis of the derived information for identifying the received frame within multiple consecutive frames in a sequence of frames, the reception information for the received frame in the data structure; and determining whether the received frame is a duplicate frame on the basis of the read reception information.

* * * * *